July 31, 1962 J. BENNETT ETAL 3,047,796
BORE HOLE LOGGING METHODS AND APPARATUS
Filed Nov. 13, 1958 4 Sheets-Sheet 1

INVENTORS
JOHN D. BENNETT &
FRED M. MAYES
BY
ATTORNEYS

July 31, 1962   J. BENNETT ETAL   3,047,796
BORE HOLE LOGGING METHODS AND APPARATUS
Filed Nov. 13, 1958   4 Sheets-Sheet 2
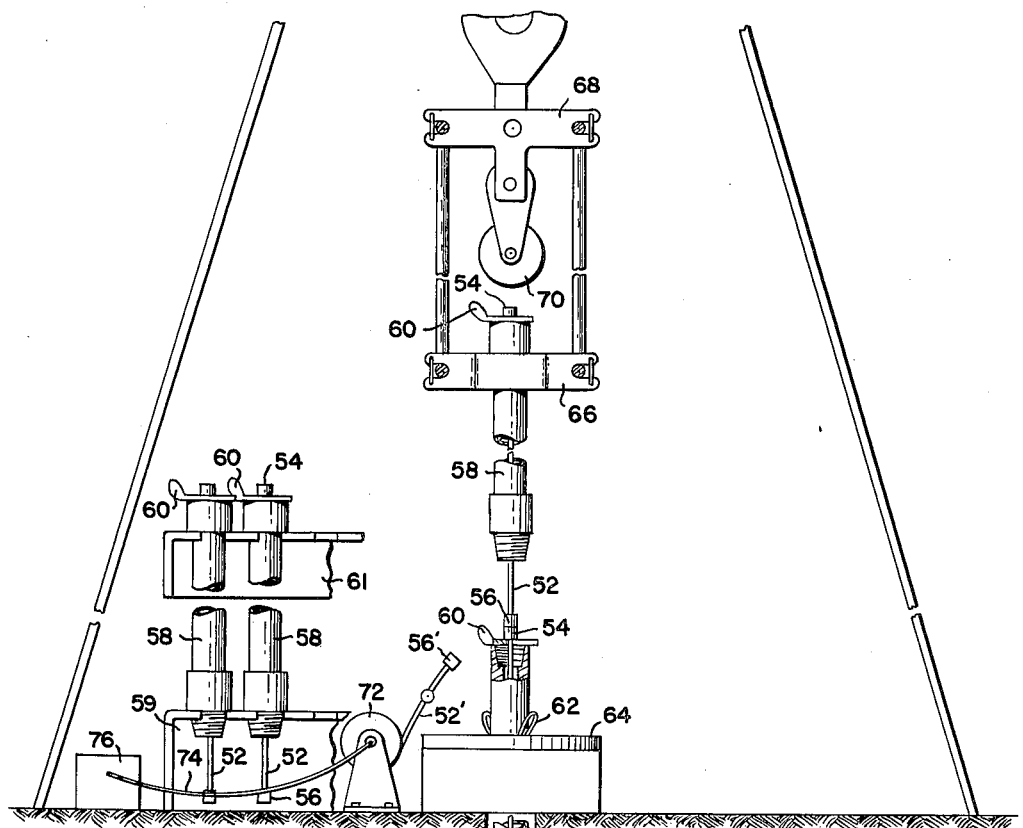
FIG. 3.
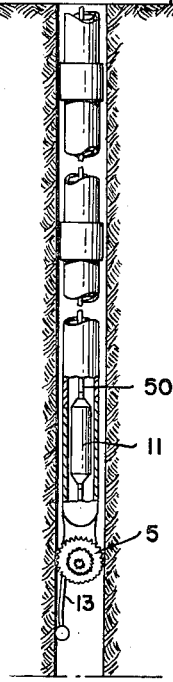
INVENTORS
JOHN D. BENNETT &
FRED M. MAYES
BY
ATTORNEYS

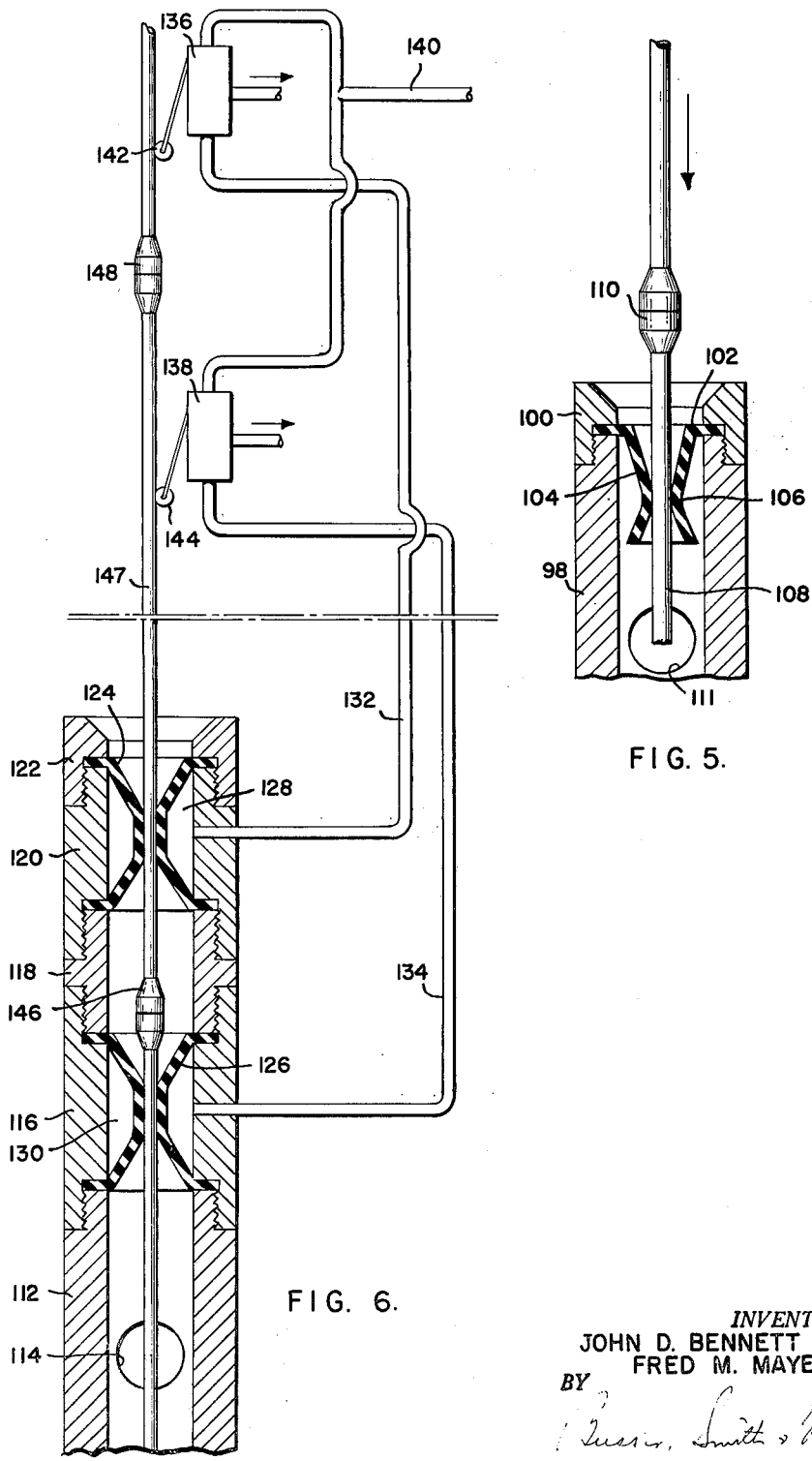

United States Patent Office 3,047,796
Patented July 31, 1962

3,047,796
BORE HOLE LOGGING METHODS
AND APPARATUS
John Bennett and Fred M. Mayes, Richardson, Tex., assignors to Sun Oil Company, Philadelphia, Pa., a corporation of New Jersey
Filed Nov. 13, 1958, Ser. No. 773,653
8 Claims. (Cl. 324—10)

This invention relates to bore hole logging methods and apparatus and particularly to methods which involve the location of recording apparatus within a hole.

Conventional methods of well logging, whether of electrical or other types, involve the absence of the drill stem during the logging operation. This has two serious drawbacks in that not only must special time be consumed in running the well log, during which time the drill stem must be out of the hole, but after a period of drilling, due to the fact that the drill stem must be removed, there is inevitably a delay before the new part of the hole may be logged, during which delay there occurs invasion of the formation by drilling liquid. Since the drilling liquid has physical properties of its own, it may, by penetration of porous layers, greatly change their properties so as to interfere with their detection. For example, in the case of electrical logging, the conductivity of the liquid will effect changes in the apparent conductivity of the formation; and in the case of acoustic logging the absorption and velocity of sound will be changed, etc.

Proposals have been made to effect electrical logging by using the drill bit or one or more other parts of the drill stem as logging electrodes. In line with this it has been proposed to supply special drill stem tubing containing one or more conductors which are electrically connected in the assembly of the drill stem and extend to recording apparatus at the surface. The use of such an arrangement has been found to be impractical because of high cost and wear.

Proposals have also been made to support one or more electrodes on wire lines to be dropped below a core bit into the lower portion of a hole from which the bit has been raised. This procedure has also proved impractical not only because special handling has been required at the surface, but particularly because core bits are not generally desired for the major drilling activities but are used only for special purposes.

The application of Fred M. Mayes and Jack Weir Jones, Serial No. 683,027, filed September 10, 1957, discloses logging methods and apparatus which may be used when the drill string is in a bore hole and may be used at any time with a minimum of interruption in drilling. In brief, in accordance with said disclosure, a self-contained energizing and recording apparatus may be dropped through a drill string in go-devil fashion or may be pumped down therethrough when the drill string has been lifted to only a limited extent from the bottom of the hole to provide a region for reception of an electrode assembly or other logging assemblies. Provision is particularly made in accordance with said disclosure to provide an assembly of a type suitable to pass through the mud flow openings of a jet bit which may be of any of the conventional popular types. Such bits are presently widely used since they effect the carrying away of cuttings and avoid their reworking by the drill. These jet openings are generally at relatively small angles with respect to the drill stem axis and a flexible assembly may, accordingly, be projected therethrough to extend beyond the bit. For electrical logging the assembly is an electrode assembly; for acoustic or other logging it may be of suitable type for exposure to the walls of a hole.

Since, in accordance with the disclosure of said Mayes and Jones application, a record is made in a self-contained assembly lowered to the vicinity of the bit, it is necessary to raise and open the assembly and play back the record made in order to secure the logging information obtained. As will be evident, in the case of each alternative type of operation referred to in said prior application there is some delay involved in securing the logging information, whether the apparatus has been lowered in go-devil fashion and recovered by an overshot or by the raising of the drill stem, or whether the recording apparatus has been lowered on a wire line, which latter operation inherently involves a further limitation on the length of the bore hole which may be logged in a single operation because of the limited travel which may be imparted to the drill stem without disassembly.

It is the general object of the present invention to provide logging methods and apparatus whereby recording may be accomplished at the surface consistently with avoidance of delay of logging at the termination of drilling and avoidance of time delay in securing information involved in the logging of an extensive length of the bore hole. Briefly, in accordance with the invention an electrode assembly, with or without a modulating or other translating unit is lowered through the drill stem upon the cessation of drilling, the drill bit being sufficiently raised to accommodate the projection of a logging wand below the bit. The lowering is accomplished by means of a cable containing one or more conductors and electrically connected to suitable recording means at the surface, which recording means may produce simultaneously with the logging a visible record which may be observed during the logging operation. The logging progress may be achieved by the raising of the drill stem. In accordance with the invention the linear extent of logging is not limited by the height of the derrick, but successive stands of the drill stem may be removed without complete withdrawal of the cable and the logging apparatus from the hole. If the log shows some indication of interest, more detailed logging may be accomplished, or other testing apparatus lowered, or drilling resumed without the complete removal of the drill stem. As will appear hereafter, several alternatives of manipulation may be utilized to effect the desired results.

The attainment of the foregoing general object and of other objects of the invention particularly relating to details of manipulation and apparatus will become apparent from the following description, read in conjunction with the accompanying drawings, in which:

FIGURE 3 is a diagrammatic elevation, partly in section, showing certain parts of the apparatus involved in a preferred application of the invention;

FIGURE 5 is a sectional view showing means for effecting packing of a cable which includes connectors of larger diameter than the cable; and FIGURE 6 is a sectional view showing an alternative packing means.

Figure 1:
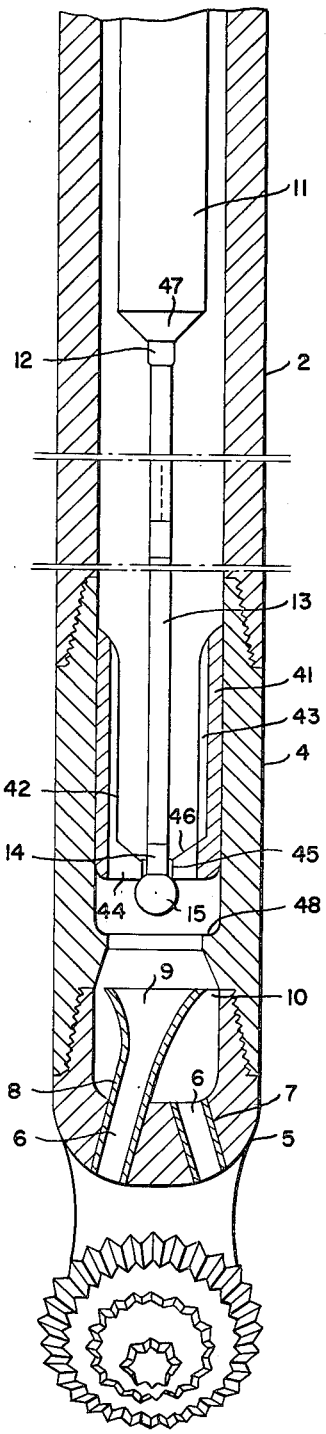
FIGURE 1 is a sectional view illustrating the lower end of a drill stem, including a jet bit, and the logging assembly in its approach to the position of the bit.

Referring first to FIGURE 1, there is indicated at 2 the lower end of a drill stem which may be considered to be located in the newly drilled portion of a hole, the drill stem having attached to it through the drill collar 4 a jet bit 5 which is illustrated as of the multiple cone rock type though it will be evident that in accordance with the invention any desired type of bit may be used providing that it has either jet passages, a central passage of the type involved in core bits, or a passage bypassing the bit and through which a logging wand may be extended. Under the conditions existing prior to the beginning of logging, the drill stem will have been raised to an extent to permit an electrode assembly to project below the bit free of engagement with the bottom of the hole.

The bit 5 is provided with the usual jet openings 6 which are usually lined by abrasion-resistant tubes 7. For present purposes, the lining of one of the holes is provided by a tube 8 which extends upwardly to open at 9 in the fashion of a funnel for the reception of the electrode assembly. During the progress of drilling, the mud passes through the tube 8 and through the other openings lined with the tubes 7, reaching the latter through the annular clearance 10 which is of such cross-section as to provide the proper and approximately equal distribution of mud to the jet holes. Generally the total number of jet holes is equal to the number of cones of a cone type rock bit, there are two such openings in the case of a fish-tail bit, etc.

There is indicated at 11 an assembly which may or may not be used depending upon the information-transmitting system which may be desired. If it is considered desirable to use a cable having a sufficient number of conductors to connect directly to the logging elements such as electrodes, the connections may be direct. More conveniently, however, and less expensive is the use of a cable having only one or a small number of conductors, in which case the assembly indicated at 11 may be used. In such case, the assembly, which in itself forms no part of the present invention and may be of numerous types well known in the art, may comprise a generator of a suitable plurality of high frequency carriers together with modulating means for individually modulating these carriers by the desired signals, such as potentials, which are picked up by electrodes or produced by other logging apparatus. The various modulated frequencies may then be transmitted to the surface from the assembly 11 over a single conductor and separated by suitable filtering means in the recording apparatus at the surface. The modulation involved may be of any of numerous types such as amplitude modulation, frequency modulation, pulse modulation, of the like. The same conductor, or another conductor, may be used to supply power, currents introduced into the earth through one or more electrodes, or the like. It is also possible to include in the assembly 11 power supply means by way of batteries for these same purposes. These various expedients are well known in the art, and from the standpoint of the present invention, it may be considered that transmitted from the logging assembly 11 are signals which may be analyzed or demodulated at the surface to recover the logging information desired. If the assembly at 11 is omitted, the transmission will be of potentials or currents such as result from the presence of the logging assembly in an open hole region below the bit.

When an assembly 11 is used, it will be furnished with a protective casing capable of withstanding the mud pressures encountered. The protective casing has extending downwardly from its lower end, supported by an adapter 12, an electrode assembly 13 which will be hereafter referred to as a wand, inasmuch as it is, as a rule, flexible though with sufficient rigidity so that it may be forced downwardly along the wall of a hole without buckling so as finally to extend substantially parallel to the axis of the hole. Depending upon the particular electrode configuration which is desired, the wand may be either relatively short or quite long, being in the latter case upwards of twenty feet in length.

Figure 2:
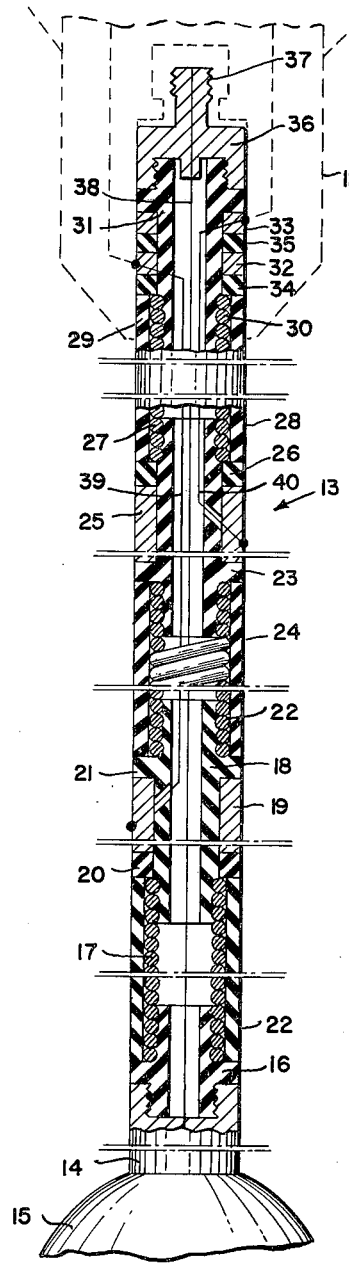
FIGURE 2 is a view, partly in section, showing a typical electrode assembly which may be used.

The wand construction is illustrated in detail in FIGURE 2 in which portions which may be of great length are shown broken, the breaks also indicating in some cases repetitions of sections as will be apparent hereafter.

It comprises a nose portion 14 which is of metal and constitutes an electrode, which electrode, depending on the electrical configuration use, may be either a current electrode or a potential electrode. Consistent with the use of the wand in the fashion illustrated in FIGURE 1, the nose has secured thereto a ball 15 which may be of rubber or other suitable abrasion-resisting material. Threaded into the nose 14 is a tubular insulator 16 which is provided with a threaded stem to which is secured the lower end of a tightly wound helical spring 17. Such a spring provides high resistance to direct end thrust, but at the same time provides sufficient flexibility for bending of the wand as it passes through a jet opening or must thereafter deflect to extend downwardly along the wall of a bore hole. As will become evident a series of springs such as 17 provide the major body of the wand, there being interspersed insulated electrodes. The upper end of the spring 17 is threaded to the lower end of a tubular insulator 18 on which is mounted a metallic electrode tube 19, the tube being confined between an insulating washer 20 and a flange 21 forming part of the tube 18. The spring 17 which connects the insulating members 16 and 18 is covered by a flexible insulating tube 22 which may be of rubber or flexible plastic. The type of construction just described is then essentially repeated, there being threaded to the upper end of member 18 another spring 22 which is threaded at its upper end to a further tubular insulator 23, the spring being covered by the flexible insulating tube 24 of rubber or plastic. The tube 23 supports between its flange and a washer 26 another tubular electrode 25. In further continuation upwardly, there is another spring 27 surrounded by a flexible insulating covering 28. The construction may be repeated to provide as many electrodes as desired in the required positions thereof. Finally the assembly is terminated by the arrangement involving the spring 30 (which may be the same as spring 27 or different) covered by the insulating tube 29. The upper end of spring 30 is threaded to the insulating tube 31 on which there are mounted a suitable number of collector rings such as 32 and 33 insulated from each other by insulating washers such as 34 and 35. To the top of the member 31 there is threaded the metallic member 36 which is arranged to be secured as indicated at 37 in a lug contained within the adapter 12. An insulated wire 38 connects the member 36 to the nose electrode 14, while insulated wires such as 39 and 40 connect the individual collector rings to the electrodes such as 19 and 25.

The electrodes may be of lead or other suitable metal, depending upon the particular electrical system employed. In the case of an electrode employed for pickup for self-potential, the electrode may desirably be of the same metal as the drill stem furnishing a reference so as to minimize any direct potential differences due to the use of different materials.

It will be evident from the foregoing that there is provided an assembly which, except for the limited regions at the electrodes, is flexible and yet has sufficient stiffness and resistance to compression so that friction may be overcome during lowering in the bore hole to the end that the wand will extend along the hole and not tend to buckle upon itself. Any desired number of electrodes flush with the outer surface of the wand may be provided and located where desired for the particular configuration involved. It may be noted that the electrodes shown, though they are individually inflexible, are of such short lengths that, from the standpoint of the sinuous path that the wand may be required to follow through a jet bit passage and then along the wall of a hole, the wand as a whole is flexible, though stiff. Other sufficiently short sections of the wand may be inflexible, if desired, with only short flexible joint portions between them. The wand, nevertheless, will, as a whole, be resistant to buckling so that it will extend generally lengthwise of a hole.

Surrounding the lower end of the wand as it is lowered with the casing 11, there is a sleeve member 41 of metal provided with a socket opening 42 for the reception of the lower end of the casing 11. Restricted mud passage grooves 43 are provided in the inner surface of member 41 and communicate with restricted passages 44 at the bottom thereof. This bottom is provided with an opening 45 through which the wand may slide, the wand initially supporting the member 41 by reason of the enlargement provided by the ball 15. One of the functions of the member 41 is to serve as a weight and guide to maintain the wand 13 in substantially axial relationship with the drill stem during lowering. Another is to provide shock absorption to prevent damage to apparatus contained within housing 11. The member 41 is provided with a conical seat 46 arranged to be engaged by the conical lower end 47 of the casing 11. An annular ledge 48 within the drill collar 4 is arranged to arrest downward movement of the member 41.

The assembly comprising the casing 11, the wand 13 and the member 41 is lowered through the drill stem on a cable which, as will appear, may be sectional or continuous, the member 41 ultimately engaging and being arrested by the annular seat 48. Mud flow is desirably maintained during the lowering, and for this purpose a cable lubricator arrangement is provided at the surface as hereafter described. Once seating at 48 occurs, mud flow is restricted by confinement of flow to openings 44 which provide a cross-section substantially less than that provided by the bit openings. Thus a shock absorbing action results. The lower end of the wand is centralized by the member 41 so that in its continued downward movement the ball 15 enters the funnel portion 9 of the liner 8 to guide the ball and then the wand therethrough, the wand flexing laterally for this passage and then again flexing when it encounters the wall of the bore hole, whereupon it thereafter will move downwardly in contact with the wall. The opening through the liner 8 is directed, as is usual, between the cones of the bit so that free downward passage of the wand may occur. Finally, the lower end of the casing 11 enters the opening 42 of member 41 and seating takes place at 46.

The foregoing lowering occurs with the bit sufficiently raised from the bottom of the hole to permit the full length of the wand to extend freely below the bit. When seating has been accomplished, the wand and the electrodes thereon will occupy particular definite positions with respect to the bit, so that their positions within the bore hole will be known. Thereafter, logging is effected by the raising of the drill stem with notation of the times at which the drill stem occupies various positions. The upward motion of the drill stem during logging may be uniform or intermittent, depending upon the length of the hole which is to be logged. If the length to be logged in a single operation is less than the free movement of the drill stem within the derrick without involving removal of sections, the logging may be continuous at a substantially uniform rate.

The present invention is particularly concerned with the possibility of logging, consistently with the use of a conductive cable, of lengths of the bore hole involving the necessity for removal of one or more stands of the drill stem.

One modification of the invention for the accomplishment of this will be made clear by particular reference to FIGURE 3. The cable which is generally designated as 50 is made up, at least through the portions which are involved in the manipulations about to be described, of sections 52 which are provided at their upper ends with coupling elements 54 and at their lower ends with coupling elements 56. As indicated in FIGURE 3, the upper coupling element of one cable section is adapted to be secured to the lower coupling element of the one above it. These couplings need not be described in detail since they may be of conventional form arranged to provide electrical continuity between the corresponding conductors of the cable sections and to be locked together through bayonet or threaded means so as to sustain longitudinal tension of the sections. Stands of the drill stem which may be removed as units are indicated at 58, each of these stands comprising usually a number of lengths of the drill pipe. When removed from the drill stem these stands are supported in suitable racks 59 and 61 in the derrick. The cable sections 52 are desirably somewhat longer in length than these individual stands, with the result that when an upper coupling element 54 is retained at the top of the uppermost drill stem section by a removable bifurcated holder such as indicated at 60 the portion of the cable therebelow involves slack accumulated in the lower sections of the drill stem and permitting the assembly 11 to rest in its proper position above the bit, with the wand fully extended so that its position is always ascertainable from consideration of the number of drill stem sections in the hole. At the completion of a length of logging by upward movement of the drill stem, the stand of drill pipe to be removed will be above the level of the slips 62 supported by the rotary table 64, which slips may then grip the stand therebelow. FIGURE 3 illustrates the condition immediately following the release of the uppermost stand which is supported by the clamp 66 from the conventional supporting member 68. At this time, there will have been released from the cable section within this stand the cable section 52' immediately preceding it which will form the part of the cable wound on the reel 72. During the logging operation, the connected cable sections will have been supported over the sheave 70. Following the attainment of the conditions illustrated in FIGURE 3, the coupling connection between 54 and 56 below the lower end of the stand to be removed will be opened, the cable section within this stand being supported by a coupling holder 60. The stand being removed may then be placed in the racks 59 and 61, and connection made between the coupling 56' attached to the portion 52' of the cable mounted on the reel and the uppermost coupling 54 of the section remaining in the drill stem. It may be noted that the portion of the cable 52' wound on the reel 72 may be short provided that the cable sections are removed with and remain in their corresponding drill stem stands 58. However, these lengths of cable may be individually removed and wound on the reel 72. This latter is generally more desirable since in the reassembly of the drill stem it would ordinarily be desirable to produce the assembly with the cable, as a whole, removed, the cable being then introduced only when logging was again to be effected. In the interest of speed of operation through the complete logging, however, the sections may be temporarily retained within the drill stem stands.

When the couplings are again connected, the logging through the length of another stand may be resumed by raising of the drill stem.

The operations just described may be repeated as many times as necessary for the logging of the desired length of the hole, records being kept of depth against time for correlation of the record with depth, time markings being desirably provided on the record. The innermost end of the cable is connected to slip rings on the shaft of the reel 72 and brushes provide connections through a cable 74 to the recording equipment 76. As has already been indicated, this recording equipment may provide a visual record, with or without a reproducable record, for example on magnetic tape, so that the logging information may be examined during the actual logging. The recording equipment will, of course, through the use of conventional demodulating means transform the signals transmitted on the cable to give the necessary graphs indicative of the properties of the formations encountered by the logging assembly. This demodulating or other translating means forms no part of the present invention and hence need not be described in detail, being of conventional type involving, if there are various carriers of different frequencies, separation of the modulated carriers, demodulation, and recording of the original modulating signals.

It will be evident from the foregoing that the objectives of the invention are attained by what has just been described. In brief, immediately following the cessation of drilling, the electrode or other logging assembly may be run into the drill stem on the conducting cable to effect projection of the wand below the bit, the bit being initially raised to provide a suitable clearance above the bottom of the hole. Logging may then immediately be carried out as described, with concurrent observation of the results at the surface, a suitable number of stands of the drill pipe being removed to provide the required movement of the logging apparatus for the logging operation desired. A minimum of delay is involved in the opening of the cable connections and removal of the stands. Finally, when the desired logging has been accomplished, the entire remaining portion of the cable may be withdrawn and with it the assembly located during the logging in the vicinity of the bit. If the bit is then to be withdrawn the disassembly of the drill stem may then proceed in the usual fashion and finally the entire cable length may be made up by incorporation of those cable lengths which may have been set aside in the removed stands in the racks.

Figure 4:
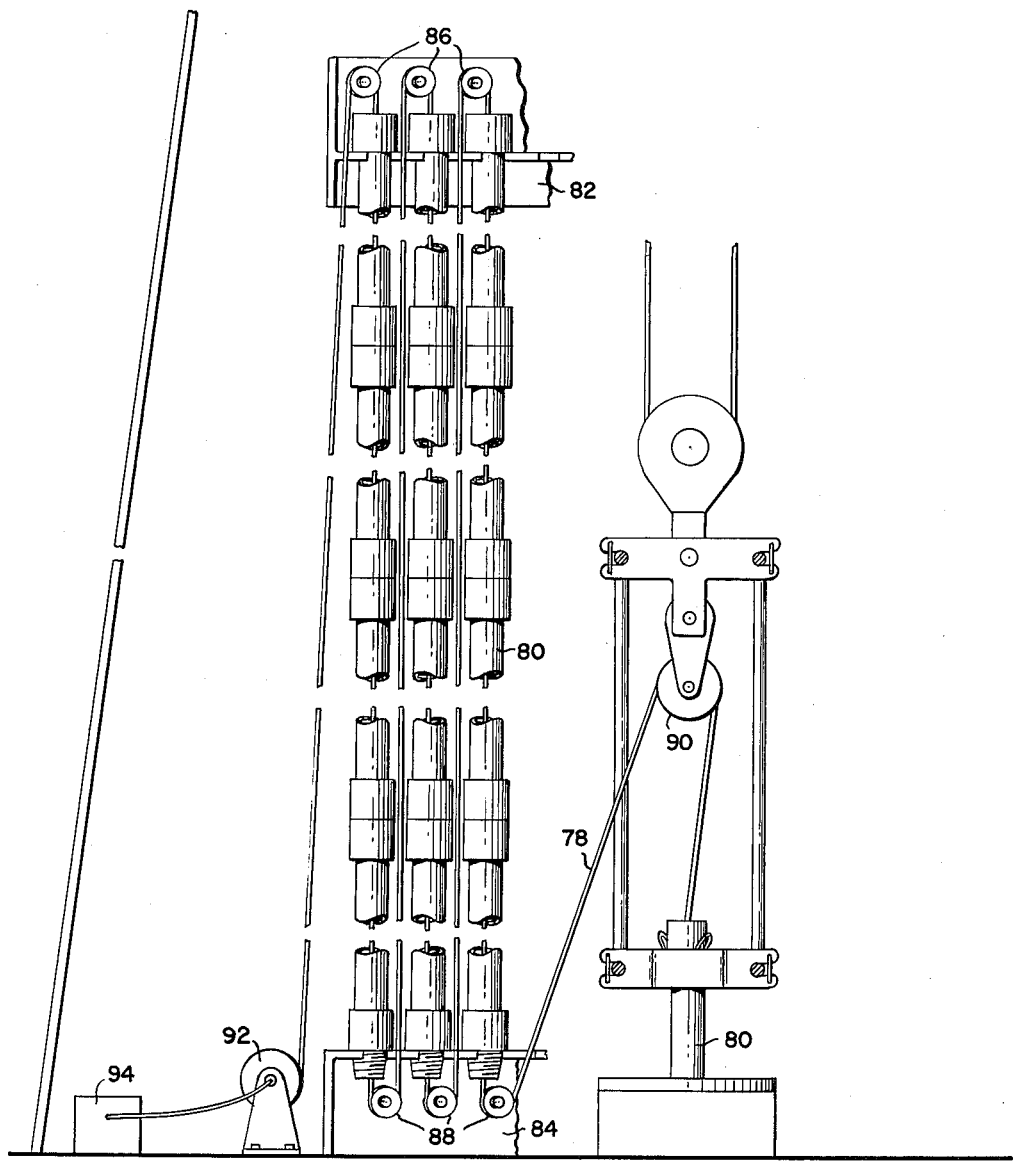
FIGURE 4 is a view similar to FIGURE 3 but showing an alternative embodiment of the invention.

If the logging is to be carried out through a length of the hole greater than that corresponding to a single stand of the drill stem but through a length corresponding to that of a limited number of such stands, the somewhat simpler arrangement shown in FIGURE 4 may be used, the cable in this case being continuous. In this modified procedure, the cable illustrated at 78 remains threaded through the removed stands 80 in series, these being arranged in sequence in the racks 82 and 84 as removal takes place, the racks being provided with sheaves 86 and 88 to permit free movements of the cable 78 which is trained over a pulley 90 carried by the withdrawing assembly and is arranged to be wound on the drum 92 electrically connected to the recording equipment 94 which is the same as that previously referred to at 76. The step by step procedure for removal of the stands will be evident, the cable being released from and trained over the sheaves 86, 88 and 90 as required. Slack may be given or taken up as necessary to prevent accumulation of excess cable in the stem or dislodgement of the detector assembly from its location at the bit by manipulations of the reel 92 as required during the disassembly of the drill stem stands. At the end of the logging operation the entire length of cable may be drawn through the removed stands and from the bore hole with final disconnection therefrom of the casing at 11 and the wand. At the beginning of a logging operation the logging assembly may be rapidly lowered following the raising of the drill stem to provide the necessary clearance below the bit.

It will be evident that this last modification of the invention permits logging through an exended length of the hole corresponding to the total length of a limited number of stands of the drill stem, the number being limited only by the extent of provisions for reeving the cable through the removed stands.

Reference has been made above to the provision of lubricators for passing the cables involved in accordance with the foregoing descriptions. In the case of the modification shown in FIGURE 4 no special type of lubricator need be involved, and conventional cable lubricators may be used for the purpose of sealing the entrance to the drill stem when it is desired to pump the apparatus supported by the cable down the hole.

However, when the modification illustrated in FIGURE 3 is used which involves connectors of larger diameter than the main portions of the cable special provisions should be made to maintain sealing while permitting the passage of the connectors. FIGURE 5 shows an arrangement which may be used at the upper end of the drill stem when only moderate pressures are involved desirable to force the electrode assembly out through the bit. Shown in FIGURE 5 is a pipe section 98 which may be secured to the upper end of the drill stem, this being surmounted by a ring 100 which clamps the flange 102 of a rubber boot 104 which is constructed at 106 to engage tightly the cable 108 so as to seal the upper end of the drill stem against the pressure of mud delivered through a lateral opening 111 to pump the apparatus downwardly. Such a rubber boot has sufficient elasticity to permit the passing of the connectors 110 which are of larger diameter than the cable.

If higher pressures of mud are involved than could be resisted by the arrangement just described, recourse may be had to what is shown in FIGURE 6. In this case, an assembly is provided to be secured to the upper end of the drill stem, which assembly comprises the lower section 112, having the mud inlet opening 114 and successive threaded sections 116, 118, 120 and 122 which clamp flange portions of rubber packing members 124 and 126 which provide central openings surrounded by annular chambers 128 and 130. By application of pressure to these chambers they may hug the cable with any desired pressure sufficient to prevent mud leakage. By removal of such pressures their flexibility is such that they will yield to pass the cable connectors of larger diameter than the cable.

Fluid (compressed air or liquid under pressure) is applied to the chambers 128 and 130 selectively through connections 132 and 134 controlled by the respective valves 136 and 138 of supply-and-waste type receiving the fluid under pressure from a supply line 140. These valves are controlled by levers and followers 142 and 144 engageable by the cable and connectors. The arrangement is such that one or the other or both of the packing devices is under pressure at all times, but when a cable connector such as 146 is about to pass through the upper packing member the applied pressure on this is relieved so that it may pass therethrough into the chamber between the packing members, the pressure being reapplied when passage has occurred, the other packing member remaining under pressure. Then, when the connector is about to pass the lower packing member the pressure on the latter is relieved to permit passage. As will be evident from the drawing, the necessary relief of pressure in each instance may be effected automatically merely by the position of a higher connector 148.

Of course, if connectors are used which have the same diameter as the cable such special provisions are not required and conventional cable lubricators may be used. It is also possible to avoid special packing, and to use conventional lubricators, if account is taken of the fact that the mud pump need only run during the actual ejection of the wand through or past the bit. Since this requires generally a movement of the order of 20 to 32 feet of cable, the length of cable provided and the location of a connector may be such that with a connector below the conventional lubricator there will be sufficient length of cable thereabove without interruption by another connector to permit the ejecting movement without the necessity for having a connector pass the lubricator.

It will be evident that the invention may be carried out with various changes in details of manipulation and apparatus used without departing from the invention as defined in the following claims.

What is claimed is:

1. A bore hole logging method comprising lowering through connected sections of a sectional drill stem carrying a bit, a cable supporting detecting means, said cable being freely movable relatively to the drill stem sections during said lowering, said lowering being carried out to effect projection of said detecting means below the bit, and effecting logging by raising of the drill stem and detecting means therewith while transmitting signals through said cable to the surface, said raising of the drill stem involving removal of at least one section thereof while the detecting means remains below the bit and connected to at least a portion of the cable extending to the surface.

2. A bore hole logging method according to claim 1 in which a portion of the cable is removed concurrently with removal of said section of the drill stem.

3. A bore hole logging method according to claim 1 in which the cable remains threaded through the removed section of the drill stem during its removal.

4. A bore hole logging method according to claim 2 in which a plurality of drill stem sections are removed with corresponding removed portions of the cable supported therein.

5. A bore hole logging method according to claim 3 in which a plurality of drill stem sections are removed and supported with the cable threaded through them in series.

6. Apparatus for bore hole logging comprising detecting means adapted to be lowered through a sectional drill stem carrying a bit and to pass through a bit and project therebelow, and a signal-transmitting cable for supporting said detecting means during its lowering through the drill stem, said cable comprising separable sections free of the drill stem for movement relative thereto and having lengths approximating lengths of removable sections of the drill stem.

7. Apparatus according to claim 6 comprising means for supporting said sections of the cable within their corresponding removed sections of the drill stem.

8. Apparatus for bore hole logging comprising detecting means adapted to be lowered through a sectional drill stem carrying a bit and to pass through a bit and project therebelow, a signal transmitting cable for supporting said detecting means during its lowering, means for supporting removed sections of said drill stem side by side, and means for guiding said cable in a zig-zag path through said supported removed sections.

References Cited in the file of this patent

UNITED STATES PATENTS

| | | |
|---|---|---|
| 2,070,912 | McDermott | Feb. 16, 1937 |
| 2,300,823 | Whitman | Nov. 3, 1942 |
| 2,650,067 | Martin | Aug. 25, 1953 |
| 2,750,569 | Moon | June 12, 1956 |